(12) United States Patent
Shershevsky et al.

(10) Patent No.: US 10,565,084 B2
(45) Date of Patent: Feb. 18, 2020

(54) DETECTING TRANSITIONS

(71) Applicant: ENTIT Software LLC, Sunnyvale, CA (US)

(72) Inventors: Olga Shershevsky, Yehud (IL); Amichai Nitsan, Yehud (IL); Aviad Israeli, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 86 days.

(21) Appl. No.: 15/565,533

(22) PCT Filed: Apr. 30, 2015

(86) PCT No.: PCT/US2015/028448
§ 371 (c)(1),
(2) Date: Oct. 10, 2017

(87) PCT Pub. No.: WO2016/175823
PCT Pub. Date: Nov. 3, 2016

(65) Prior Publication Data
US 2018/0089054 A1   Mar. 29, 2018

(51) Int. Cl.
*G06F 11/34* (2006.01)
*G06F 17/22* (2006.01)

(52) U.S. Cl.
CPC ...... *G06F 11/3438* (2013.01); *G06F 17/2211* (2013.01); *G06F 17/2247* (2013.01); *G06F 11/3409* (2013.01); *G06F 2201/865* (2013.01)

(58) Field of Classification Search
CPC .. G06F 11/34; G06F 11/3438; G06F 17/2211; G06F 17/2247

USPC ........................................................ 709/224
See application file for complete search history.

(56) References Cited

U.S. PATENT DOCUMENTS

| | | | |
|---|---|---|---|
| 8,381,094 B1 | 2/2013 | Prasad et al. | |
| 8,516,080 B2 | 8/2013 | Chow et al. | |
| 8,533,532 B2 | 9/2013 | Wenig et al. | |
| 8,739,023 B2 | 5/2014 | Nemati et al. | |
| 2007/0150556 A1* | 6/2007 | Fukuda | G06F 16/958 709/219 |
| 2008/0184102 A1* | 7/2008 | Selig | G06F 17/243 715/234 |
| 2009/0063500 A1* | 3/2009 | Zhai | G06F 16/81 |
| 2009/0070392 A1* | 3/2009 | Le Roy | G06F 16/958 |
| 2012/0054203 A1 | 3/2012 | Clary et al. | |
| 2012/0143947 A1* | 6/2012 | Kikuchi | G06Q 30/02 709/203 |

(Continued)

OTHER PUBLICATIONS

Andrews, A. et al., Testing Web Applications, (Research Paper), Sep. 23, 2003. 21 pgs.

(Continued)

*Primary Examiner* — Tonia L Dollinger
*Assistant Examiner* — Adam A Cooney

(57) ABSTRACT

Examples disclosed herein relate to creating a first document skeleton associated with a first state of an application, creating a second document skeleton associated with a second state of the application, determining, according to a comparison of the first document skeleton and a second document skeleton, whether a transition occurred in the application, and in response to determining that the transition occurred in the application, logging a measured metric associated with the application.

20 Claims, 3 Drawing Sheets

(56) References Cited

U.S. PATENT DOCUMENTS

2014/0123000 A1* 5/2014 Decker ............... G06F 17/2247
715/234
2015/0113383 A1 4/2015 Yuhan et al.
2016/0170953 A1* 6/2016 Maddali ................ G06F 16/986
715/234

OTHER PUBLICATIONS jQuery Mobile's navigation model, (Research Paper), Nov. 2, 2010. 6 pgs.
Patel, P., White Paper on Single Page Application, (Research Paper), Feb. 13, 2015. 8 Pgs.
International Searching Authority., International Search Report and Written Opinion dated Feb. 1, 2016 for PCT Application No. PCT/US2015/028448, Filed Apr. 30, 2015, 15 pgs.

* cited by examiner

DETECTING TRANSITIONS

BACKGROUND

Transition detection allows for the identification of changes within logical web pages. For example, user experience tracking often relies on detecting when an action has changed the visual display in a web application. In some applications, some but not all elements and sections of a web page are updated and/or reloaded, resulting in a logical page transition instead of a standard page transition wherein a new web page is loaded by the browser.

BRIEF DESCRIPTION OF THE DRAWINGS

In the accompanying drawings, like numerals refer to like components or blocks. The following detailed description references the drawings, wherein.

DETAILED DESCRIPTION

As described above, transition detection may identify when a logical transition occurs in a web application. For example, a web page may be rendered based on an underlying structure, such as the Document Object Model (DOM). The structure may comprise various elements, such as images, text, hyperlinks, controls, forms as well as scripts to handle performing functions for the web application. In some implementations, web applications may remain on a same main page while performing functionality to update, move, and/or replace elements as a logical page transition.

In the description that follows, reference is made to the term, "non-transitory machine-readable storage medium." As used herein, the term "non-transitory machine-readable storage medium" refers to any electronic, magnetic, optical, or other physical storage device that stores executable instructions or other data (e.g., a hard disk drive, random access memory, flash memory, etc.).

Figure 1:
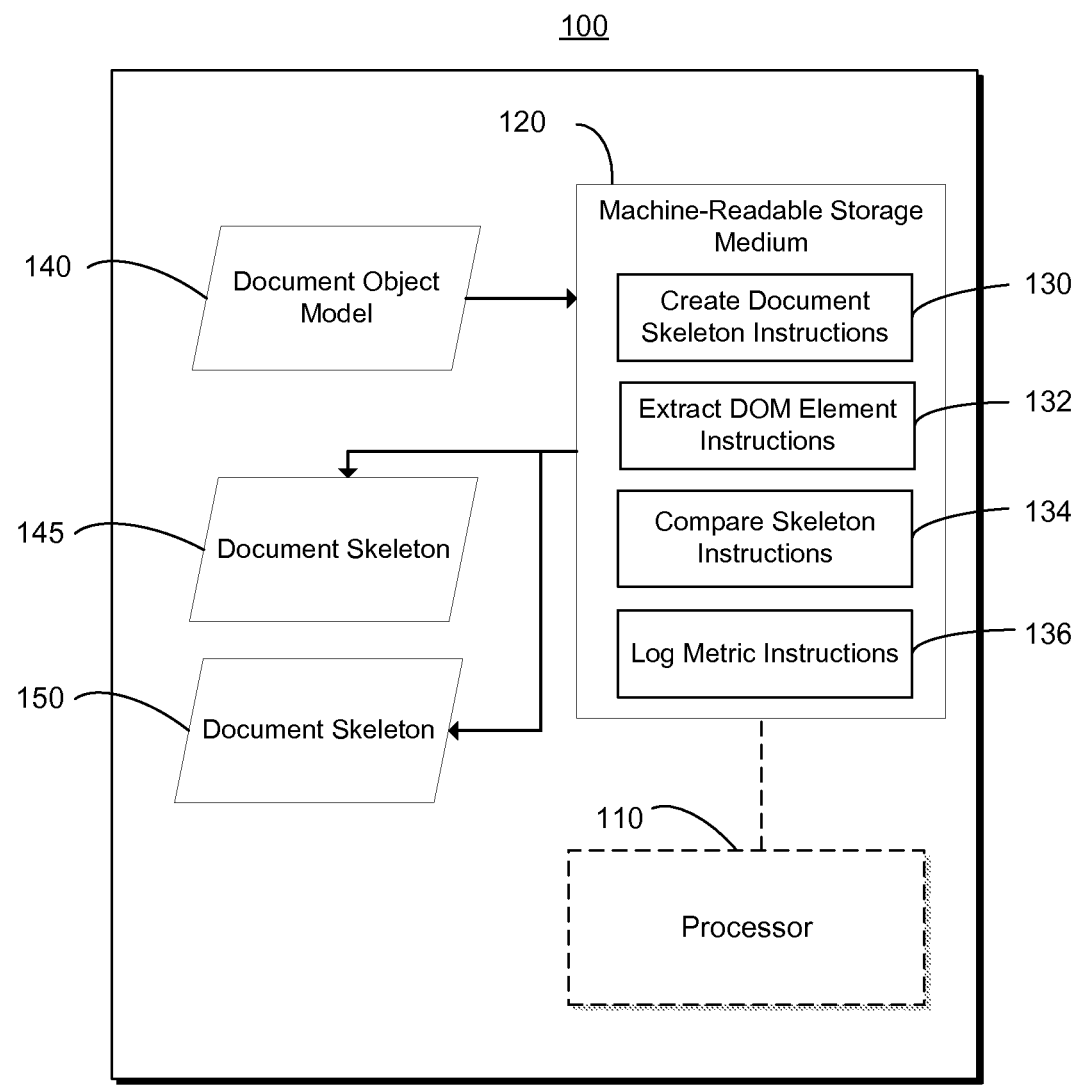
FIG. 1 is a block diagram of an example transition detection device.

Referring now to the drawings, FIG. 1 is a block diagram of an example transition detection device 100 consistent with disclosed implementations. Transition detection device 100 may comprise a processor 110 and a non-transitory machine-readable storage medium 120. Transition detection device 100 may comprise a computing device such as a server computer, a desktop computer, a laptop computer, a handheld computing device, a smart phone, a tablet computing device, a mobile phone, or the like.

Processor 110 may comprise a central processing unit (CPU), a semiconductor-based microprocessor, or any other hardware device suitable for retrieval and execution of instructions stored in machine-readable storage medium 120. In particular, processor 110 may fetch, decode, and execute a plurality of create document skeleton instructions 130, extract document object model (DOM) element instructions 132, compare skeleton instructions 134, and log metric instructions 136 to implement the functionality described in detail below.

Executable instructions may be stored in any portion and/or component of machine-readable storage medium 120. The machine-readable storage medium 120 may comprise both volatile and/or nonvolatile memory and data storage components. Volatile components are those that do not retain data values upon loss of power. Nonvolatile components are those that retain data upon a loss of power.

The machine-readable storage medium 120 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Transition detection device 100 may further comprise a document object model 140, a first document skeleton 145, and a second document skeleton 150. In some implementations, DOM 140 and document skeletons 145, 150 may be stored in machine-readable storage medium 120 and/or another memory accessible to device 100 such as those described above. DOM 140 and document skeletons 145, 150 may be associated with an application (not shown) executing on device 100.

DOM 140 may comprise a language-independent representation of a plurality of elements associated with a user interface for an application. DOM 140 may provide for representing and interacting with objects in, for example, HTML, XHTML, and XML application documents. The elements of such application documents may be organized in a tree structure. Objects in the tree structure may be addressed and manipulated by using methods from various programming languages on the objects. When DOM 140 is rendered, as a web page for example, a browser loads DOM 140 into memory and parses each of the elements in the tree structure to translate at least some of the elements into visible user interface elements as applicable.

Create document skeleton instructions 130 may create a listing of visible application elements associated with an application user interface. In some implementations, each skeleton may be created for a state of the application, such as upon detecting a start and/or an end of a user action. For example, create document skeleton instructions 130 may create first document skeleton 145 upon detecting the start of a user action and may create second document skeleton 150 upon detecting the completion of a user action. Document skeletons 145, 150 may comprise lists comprising a subset of elements from a document object model (DOM).

User actions may be translated into events that may be manipulated through code and/or scripts based on ASP, Java, JavaScript, Objective C, and various other programming languages. Whenever a user initiates an action (e.g. touch, swipe) on the user client, a sequence of events (e.g. touch-start, click, touchend) may be triggered so that event listeners in an application may process the action. For example, a "swipe" user action may result in event listeners for "touchstart", "touchmove", "touchcancel", "touchend" being called. In such an example, "touchstart" may be associated with a first state, such as the start of a user action, and "touchend" may be associated with a second state, such as the end of a user action. In some implementations, the end of the user action may be associated with a third state, such as when the application user interface has finished updating in response to the execution of the called event listeners for the user action.

Extract DOM element instructions 132 may extract each of the plurality of application elements from a document object model, such as DOM 140, associated with the application. The extracted elements may be used to create document skeletons 145, 150 by create document skeleton instructions 130. In some implementations, extract DOM element instructions 132 may determine whether each of a plurality of the document object model elements comprise a user visible element.

User visible elements may comprise elements actually displayed in a user interface of the application. In some implementations, visibility may be determined according to an application programming interface (API) query, a visibility property, and a layer property. For example, an element may comprise a method such as "isVisible" that returns a Boolean value of true if the element is currently displayed or false if the element is not currently displayed. For another example, a CSS style property of "hidden" may comprise a visibility property indicating that the element is not currently displayed. Another example visibility property may comprise a size property; a size below a minimum threshold, such as 5×5 pixels, may be determined to comprise a non-visible element, while larger sizes may be associated with visible elements. A layer property may identify whether an element is in front of another element sharing the same display space in the user interface. The "front" element may comprise a visible element while the element behind the front element may be determined to not be visible.

Compare skeleton instructions 134 may determine, according to a comparison of the first document skeleton and a second document skeleton, whether a transition occurred in the application. For example, compare skeleton instructions 134 may perform an element by element comparison of first document skeleton 145 and second document skeleton 150. The comparison may determine, for example, which and/or how many elements are present in one document skeleton that are not present in another and/or what changes occurred in the display of an element between first document skeleton 145 and second document skeleton 150. Such changes may comprise, for example, a change in visibility for an element, a change in size, a movement of the element(s) within a user interface, and/or a change in content. For example, an element comprising a list of text, such as a menu, may comprise changed content after a user clicks on one menu item and the menu expands to display a sub-menu.

In some implementations, compare skeleton instructions 134 may determine whether the transition occurred in the application comprise instructions to determine whether the first document skeleton differs from the second document skeleton by a threshold amount. For example, a transition may require that the overall skeletons differ by greater than some amount, such as 70% and/or may require that at least one large element, such as a central content element and/or an element occupying more than 30% of the visual space of the user interface, have changed.

Log metric instructions 136 may, in response to determining that the transition occurred in the application, log a measured metric associated with the application. In some implementations, an application may monitor the user experience by measuring performance metrics associated with the performance of user actions. Performance metrics may comprises data such as an amount of time taken to complete an action, an amount of resources used to perform the action, a number, if any, of errors and/or exceptions generated by the action, etc. These performance metrics may then be written to a performance log as associated with the completed user action in instances where the user action resulted in a transition in the application.

Figure 2:
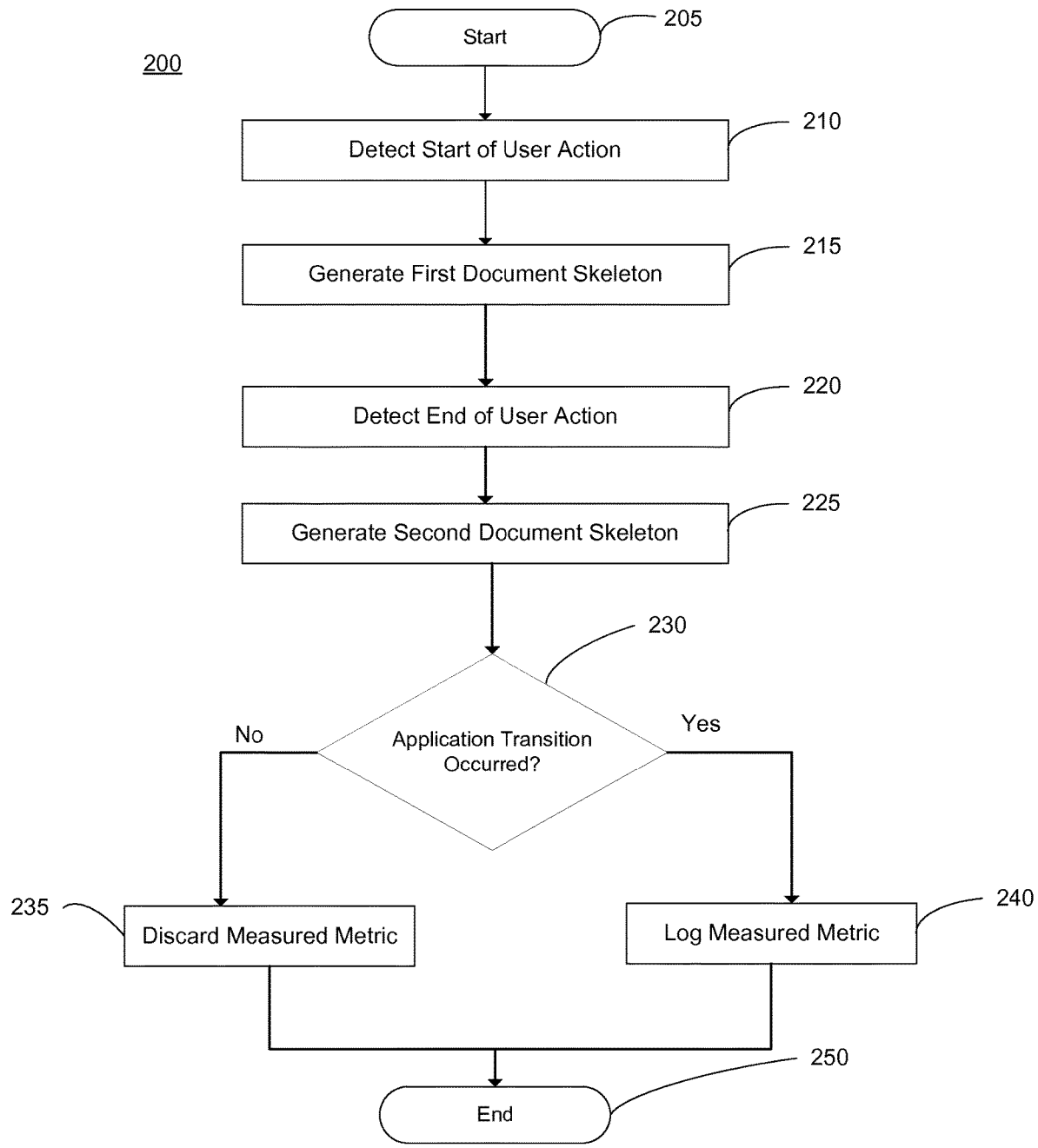
FIG. 2 is a flowchart of an example of a method for transition detection.

FIG. 2 is a flowchart of an example of a method 200 for transition detection consistent with disclosed implementations. Although execution of method 200 is described below with reference to the components of transition detection device 100, other suitable components for execution of method 200 may be used.

Method 200 may start in block 205 and proceed to block 210 where device 100 may detect a start of a user action associated with an application. User actions may be translated into events that may be manipulated through code and/or scripts based on ASP, Java, JavaScript, Objective C, and various other programming languages. Whenever a user initiates an action (e.g. touch, swipe) on the user client, a sequence of events (e.g. touchstart, click, touchend) may be triggered so that event listeners in an application may process the action. For example, a "swipe" user action may result in event listeners for "touchstart", "touchmove", "touchcancel", "touchend" being called. In such an example, "touchstart" may be associated with a first state, such as the start of a user action, and "touchend" may be associated with a second state, such as the end of a user action.

Method 200 may then advance to block 215 where device 100 may generate a first document skeleton from a document object model associated with the application. In some implementations, generating the first document skeleton from the document object model may comprise extracting a plurality of user visible elements from the document object model. For example, create document skeleton instructions 130 may create a listing of visible application elements associated with an application user interface. In some implementations, each skeleton may be created for a state of the application, such as upon detecting a start and/or an end of a user action. For example, create document skeleton instructions 130 may create first document skeleton 145 upon detecting the start of a user action and may create second document skeleton 150 upon detecting the completion of a user action.

In some implementations, extract DOM element instructions 132 may extract each of the plurality of application elements from a document object model, such as DOM 140, associated with the application. The extracted elements may be used to create document skeletons 145, 150 by create document skeleton instructions 130. In some implementations, extract DOM element instructions 132 may determine whether each of a plurality of the document object model elements comprise a user visible element.

User visible elements may comprise elements actually displayed in a user interface of the application. In some implementations, visibility may be determined according to an application programming interface (API) query, a visibility property, and a layer property. For example, an element may comprise a method such as "isVisible" that returns a Boolean value of true if the element is currently displayed or false if the element is not currently displayed. For another example, a CSS style property of "hidden" may comprise a visibility property indicating that the element is not currently displayed. Another example visibility property may comprise a size property; a size below a minimum threshold, such as 5×5 pixels, may be determined to comprise a non-visible element, while larger sizes may be associated with visible elements. A layer property may identify whether an element is in front of another element sharing the same display space in the user interface. The "front" element may comprise a visible element while the element behind the front element may be determined to not be visible.

Method 200 may then advance to block 220 where device 100 may detect an end of the user action associated with the application. Detection of the end of the user action may proceed as described above with respect to detecting the start of the user action. In some implementations, the end of the user action may be associated with a third state, such as when the application user interface has finished updating in response to the execution of the called event listeners for the user action.

Method 200 may then advance to block 225 where device 100 may generate a second document skeleton from the document object model associated with the application. In some implementations, document skeletons may be created for a state of the application, such as upon detecting a start and/or an end of a user action. For example, create document skeleton instructions 130 may create first document skeleton 145 upon detecting the start of a user action and may create second document skeleton 150 upon detecting the completion of a user action.

In some implementations, generating the document skeletons may comprise parsing the tree of the document object model associated with the application, wherein the tree comprises a plurality of parent and child elements. In response to determining that particular elements of the document object model are not visible, device 100 may determine whether the element comprises a child element and, if so, determine whether the child element is visible. Visible child elements may be added to the document skeleton as described above.

Method 200 may then advance to block 230 where device 100 may determine, according to a comparison of the first document skeleton and a second document skeleton, whether a transition occurred in the application. In some implementations, determining whether the transition occurred in the application comprises may comprise determining whether at least one of the plurality of user visible elements changed between the first document skeleton and the second document skeleton. Determining whether the at least one of the plurality of user visible elements changed between the first document skeleton and the second document skeleton may comprise, for example, identifying a change in visibility for the at least one of the plurality of user visible elements, a change in size for the at least one of the plurality of user visible elements, a movement for the at least one of the plurality of user visible elements, and a change in content for the at least one of the plurality of user visible elements.

In some implementations, compare skeleton instructions 134 may determine, according to a comparison of the first document skeleton and a second document skeleton, whether a transition occurred in the application. For example, compare skeleton instructions 134 may perform an element by element comparison of first document skeleton 145 and second document skeleton 150. The comparison may determine, for example, which and/or how many elements are present in one document skeleton that are not present in another and/or what changes occurred in the display of an element between first document skeleton 145 and second document skeleton 150. Such changes may comprise, for example, a change in visibility for an element, a change in size, a movement of the element(s) within a user interface, and/or a change in content. For example, an element comprising a list of text, such as a menu, may comprise changed content after a user clicks on one menu item and the menu expands to display a sub-menu.

In some implementations, compare skeleton instructions 134 may determine whether the transition occurred in the application comprise instructions to determine whether the first document skeleton differs from the second document skeleton by a threshold amount. For example, a transition may require that the overall skeletons differ by greater than some amount, such as 70% and/or may require that at least one large element, such as a central content element and/or an element occupying more than 30% of the visual space of the user interface, have changed.

In response to determining that the transition occurred in the application, method 200 may advance to block 240 where device 100 may log a measured metric associated with the user action. For example, log metric instructions 136 may, in response to determining that the transition occurred in the application, log a measured metric associated with the application. In some implementations, an application may monitor the user experience by measuring performance metrics associated with the performance of user actions. Performance metrics may comprises data such as an amount of time taken to complete an action, an amount of resources used to perform the action, a number, if any, of errors and/or exceptions generated by the action, etc. These performance metrics may then be written to a performance log as associated with the completed user action in instances where the user action resulted in a transition in the application.

In response to determining that the transition did not occur in the application, method 200 may advance to block 235 where device 100 may discard the measured metric.

After discarding the measured metric at block 235 or logging the measured metric at block 240, method 200 may then end at block 250.

Figure 3:
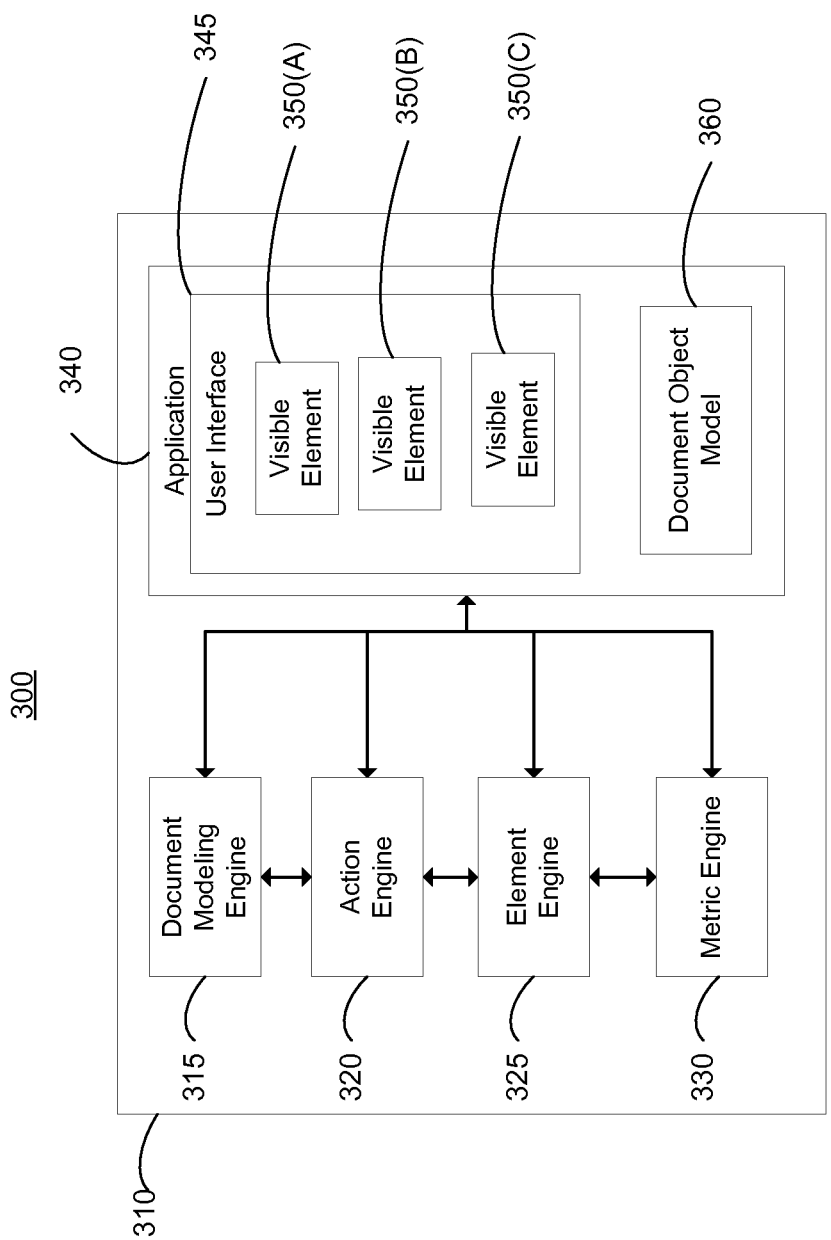
FIG. 3 is a block diagram of an example system for transition detection.

FIG. 3 is a block diagram of a system 300 for transition detection. System 300 may comprise a computing device 310 comprising a document modeling engine 315, an action engine 320, an element engine 325, and a metric engine 330. System 300 may further comprise an application 340 executing on system 300 comprising a user interface 345 comprising a plurality of visible elements 350(A)-(C) and a document object model (DOM) 360. Computing device 310 may comprise, for example, a general and/or special purpose computer, server, mainframe, desktop, laptop, tablet, smart phone, game console, and/or any other system capable of providing computing capability consistent with providing the implementations described herein.

Each of engines 315, 320, 325, and 330 as well as application 345 may comprise any combination of hardware and instructions (e.g. programming) to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 315, 320, 325, and 330 as well as application 345. In such examples, system 300 may comprise the machine-readable storage medium storing the instructions and the processing resource to execute the instructions, or the machine-readable storage medium may be separate but accessible to system 300 and the processing resource.

Document modeling engine 315 may extract a plurality of elements from a document object model associated with a web-based application. For example, DOM 360 may comprise a language-independent representation of a plurality of elements associated with a user interface for an application. DOM 360 may provide for representing and interacting with objects in, for example, HTML, XHTML, and XML application documents. The elements of such application documents may be organized in a tree structure. Objects in the tree structure may be addressed and manipulated by using methods from various programming languages on the objects. When DOM 360 is rendered, as a web page for example, a browser loads DOM 360 into memory and parses each of the elements in the tree structure to translate at least some of the elements into visible user interface elements as applicable.

In some implementations, extract DOM element instructions 132 may extract each of the plurality of application elements from a document object model, such as DOM 360, associated with the application. In some implementations, extract DOM element instructions 132 may determine whether each of a plurality of the document object model elements comprise a user visible element.

User visible elements, such as visible elements 350(A)-(C) may comprise elements actually displayed in user interface 345 of application 340. In some implementations, visibility may be determined according to an application programming interface (API) query, a visibility property, and a layer property. For example, an element may comprise a method such as "isVisible" that returns a Boolean value of true if the element is currently displayed or false if the element is not currently displayed. For another example, a CSS style property of "hidden" may comprise a visibility property indicating that the element is not currently displayed. Another example visibility property may comprise a size property; a size below a minimum threshold, such as 5×5 pixels, may be determined to comprise a non-visible element, while larger sizes may be associated with visible elements. A layer property may identify whether an element is in front of another element sharing the same display space in the user interface. The "front" element may comprise a visible element while the element behind the front element may be determined to not be visible.

Action engine 320 may detect a start and/or an end of a user action associated with the application. User actions may be translated into events that may be manipulated through code and/or scripts based on ASP, Java, JavaScript, Objective C, and various other programming languages. Whenever a user initiates an action (e.g. touch, swipe) on the user client, a sequence of events (e.g. touchstart, click, touchend) may be triggered so that event listeners in an application may process the action. For example, a "swipe" user action may result in event listeners for "touchstart", "touchmove", "touchcancel", "touchend" being called. In such an example, "touchstart" may be associated with a first state, such as the start of a user action, and "touchend" may be associated with a second state, such as the end of a user action.

Detection of the end of the user action may proceed as described above with respect to detecting the start of the user action. In some implementations, the end of the user action may be associated with a third state, such as when the application user interface has finished updating in response to the execution of the called event listeners for the user action.

Element engine 325 may create document skeletons associated with states of the application, such as at the start and/or the end of the user action. The document skeletons may comprise user visible elements, such as visible elements 350(A)-(C).

In some implementations, generating the first document skeleton from document object model 360 may comprise extracting user visible elements 350(A)-(C) from document object model 360. For example, create document skeleton instructions 130 may create a listing of visible application elements associated with user interface 345. In some implementations, each skeleton may be created for a state of the application, such as upon detecting a start and/or an end of a user action. For example, create document skeleton instructions 130 may create first document skeleton 145 upon detecting the start of a user action and may create second document skeleton 150 upon detecting the completion of a user action.

In some implementations, extract DOM element instructions 132 may extract each of the plurality of application elements from a document object model, such as DOM 360, associated with application 340. The extracted elements may be used to create document skeletons 145, 150 by create document skeleton instructions 130. In some implementations, extract DOM element instructions 132 may determine whether each of a plurality of the document object model elements comprise a user visible element.

User visible elements 350(A)-(C) may comprise elements actually displayed in user interface 345 of application 340. In some implementations, visibility may be determined according to an application programming interface (API) query, a visibility property, and a layer property. For example, an element may comprise a method such as "isVisible" that returns a Boolean value of true if the element is currently displayed or false if the element is not currently displayed. For another example, a CSS style property of "hidden" may comprise a visibility property indicating that the element is not currently displayed. Another example visibility property may comprise a size property; a size below a minimum threshold, such as 5×5 pixels, may be determined to comprise a non-visible element, while larger sizes may be associated with visible elements. A layer property may identify whether an element is in front of another element sharing the same display space in the user interface. The "front" element may comprise a visible element while the element behind the front element may be determined to not be visible.

Metric engine 330 may measure a metric associated with the user action, and determine whether a transition has occurred in the application. In response to determining that the logical transition has occurred in the application, metric engine 330 may log the measured metric associated with the user action. Otherwise, metric engine 330 may discard the measured metric associated with the user action. For example, log metric instructions 136 may, in response to determining that the transition occurred in the application, log a measured metric associated with the application.

In some implementations, an application may monitor the user experience by measuring performance metrics associated with the performance of user actions. Performance metrics may comprises data such as an amount of time taken to complete an action, an amount of resources used to perform the action, a number, if any, of errors and/or exceptions generated by the action, etc. These performance metrics may then be written to a performance log as associated with the completed user action in instances where the user action resulted in a transition in the application.

In some implementations, determining whether the transition occurred in the application comprises may comprise determining whether at least one of the plurality of user visible elements changed between the first document skeleton and the second document skeleton. Determining whether the at least one of the plurality of user visible elements changed between the first document skeleton and the second document skeleton may comprise, for example, identifying a change in visibility for the at least one of the plurality of user visible elements, a change in size for the at least one of the plurality of user visible elements, a movement for the at least one of the plurality of user visible elements, and a change in content for the at least one of the plurality of user visible elements.

In some implementations, compare skeleton instructions 134 may determine, according to a comparison of the first document skeleton and a second document skeleton, whether a transition occurred in the application. For example, compare skeleton instructions 134 may perform an element by element comparison of first document skeleton 145 and second document skeleton 150. The comparison may determine, for example, which and/or how many elements are present in one document skeleton that are not present in another and/or what changes occurred in the display of an element between first document skeleton 145 and second document skeleton 150. Such changes may comprise, for example, a change in visibility for an element, a change in size, a movement of the element(s) within a user interface, and/or a change in content. For example, an element comprising a list of text, such as a menu, may comprise changed content after a user clicks on one menu item and the menu expands to display a sub-menu.

In some implementations, compare skeleton instructions 134 may determine whether the transition occurred in the application comprise instructions to determine whether the first document skeleton differs from the second document skeleton by a threshold amount. For example, a transition may require that the overall skeletons differ by greater than some amount, such as 70% and/or may require that at least one large element, such as a central content element and/or an element occupying more than 30% of the visual space of the user interface, have changed.

The disclosed examples may include systems, devices, computer-readable storage media, and methods for transition detection. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions which, when executed by a processor, cause the processor to:
   create a first document skeleton associated with a first state of an application, the first document skeleton including only a first subset of elements extracted from a document object model of the application, wherein each of the first subset of elements in the first skeleton is a user visible element of the application;
   create a second document skeleton associated with a second state of the application, the second document skeleton including only a second subset of elements extracted from the document object model of the application, wherein each of the second subset of elements in the second skeleton is a user visible element of the application;
   determine, according to a comparison of the first document skeleton and the second document skeleton, whether a first element is different between the first document skeleton and the second document skeleton; and
   in response to a determination that the first element is different between the first document skeleton and the second document skeleton, log a measured metric associated with the application.

2. The non-transitory machine-readable storage medium of claim 1, wherein the determination comprises a determination that the first element is included in the first document skeleton and is not included in the second document skeleton.

3. The non-transitory machine-readable storage medium of claim 1, wherein the determination comprises a determination that a size of the first element in the first document skeleton is different from the size of the first element in the second document skeleton.

4. The non-transitory machine-readable storage medium of claim 1, wherein the determination comprises a determination that a content of the first element in the first document skeleton is different from the content of the first element in the second document skeleton.

5. The non-transitory machine-readable storage medium of claim 1, comprising instructions to determine whether each element of the document object model is user visible according to at least one of the following: an application programming interface (API) query, a visibility property, and a layer property.

6. The non-transitory machine-readable storage medium of claim 1, comprising instructions to:
   create the first document skeleton in response to a detection of a start of a first user action associated with the application, and
   create the second document skeleton in response to a detection of an end of the first user action associated with the application.

7. The non-transitory machine-readable storage medium of claim 1, wherein the instructions to determine whether the first element is different between the first document skeleton and in the second document skeleton comprise instructions to determine whether the first element in the first document skeleton differs from the first element in the second document skeleton by at least a threshold amount.

8. A computer-implemented method comprising:
detecting a start of a first user action associated with an application;
in response to a detection of the start of the first user action, generating a first document skeleton including only a first subset of elements extracted from a document object model associated with the application, wherein each of the first subset of elements in the first skeleton is a user visible element of the application;
detecting an end of the first user action associated with the application;
in response to a detection of the end of the first user action, generating a second document skeleton only a second subset of elements extracted from the document object model associated with the application, wherein each of the second subset of elements in the second skeleton is a user visible element of the application;
determining, according to a comparison of the first document skeleton and a second document skeleton, whether a first element is different between the first document skeleton and the second document skeleton; and
in response to determining that the first element is different between the first document skeleton and the second document skeleton, logging a measured metric associated with the first user action.

9. The computer-implemented method of claim 8, wherein determining that the first element is different between the first document skeleton and the second document skeleton comprises determining that the first element is included in the first document skeleton and is not included in the second document skeleton.

10. The computer-implemented method of claim 8, wherein determining that the first element is different between the first document skeleton and the second document skeleton comprises determining that a size of the first element in the first document skeleton is different from the size of the first element in the second document skeleton.

11. The computer-implemented method of claim 8, wherein determining that the first element is different between the first document skeleton and the second document skeleton comprises determining a change in visibility for the first element between the first document skeleton and the second document skeleton.

12. The computer-implemented method of claim 8, wherein determining that the first element is different between the first document skeleton and the second document skeleton comprises determining a change in a location of the first element between the first document skeleton and the second document skeleton.

13. The computer implemented method of claim 8, wherein determining that the first element is different between the first document skeleton and the second document skeleton comprises determining that the first element is changed by at least a threshold amount.

14. The computer implemented method of claim 9, further comprising in response to determining that the first element is not different between the first document skeleton and the second document skeleton, discarding the measured metric.

15. A system for transition detection, comprising:
a processor; and
a storage device storing instructions, the instructions executable by the processor to:
detect a start of a first user action associated with the application, and detect an end of the first user action associated with the application;
in response to a detection of the start of the first user action, create a first document skeleton including only a first subset of elements extracted from a document object model associated with the application, wherein each of the first subset of elements in the first skeleton is a user visible element of the application;
in response to a detection of the end of the first user action, create a second document skeleton including only a second subset of elements extracted from the document object model associated with the application, wherein each of the second subset of elements in the second skeleton is a user visible element of the application;
determine, according to a comparison of the first document skeleton and the second document skeleton, whether a first element is different between the first document skeleton and the second document skeleton;
in response to determining that the first element is different between the first document skeleton and the second document skeleton, log a measured metric associated with the first user action; and
in response to determining that the first element is not different between the first document skeleton and the second document skeleton, discard the measured metric associated with the first user action.

16. The system of claim 15, wherein determining that the first element is different between the first document skeleton and the second document skeleton comprises determining that the first element is included in the first document skeleton and is not included in the second document skeleton.

17. The system of claim 15, wherein determining that the first element is different between the first document skeleton and the second document skeleton comprises determining that a size of the first element in the first document skeleton is different from the size of the first element in the second document skeleton.

18. The system of claim 15, wherein determining that the first element is different between the first document skeleton and the second document skeleton comprises determining that a content of the first element in the first document skeleton is different from the content of the first element in the second document skeleton.

19. The system of claim 15, wherein determining that the first element is different between the first document skeleton and the second document skeleton comprises determining a change in a location of the first element between the first document skeleton and the second document skeleton.

20. The system of claim 15, wherein determining that the first element is different between the first document skeleton and the second document skeleton-comprises determining that the first element in the first document skeleton differs from the first element in the second document skeleton by at least a threshold amount.

* * * * *